June 2, 1964  J. M. CALLAN ETAL  3,135,914
MULTI-FREQUENCY TESTING METHOD AND APPARATUS FOR SELECTIVELY
DETECTING FLAWS AS DIFFERENT DEPTHS
Filed Sept. 4, 1959   3 Sheets-Sheet 1
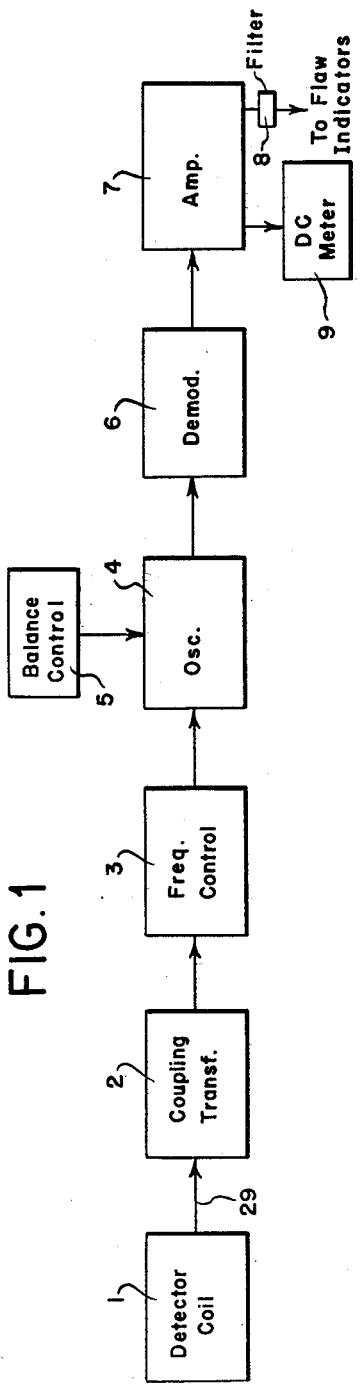
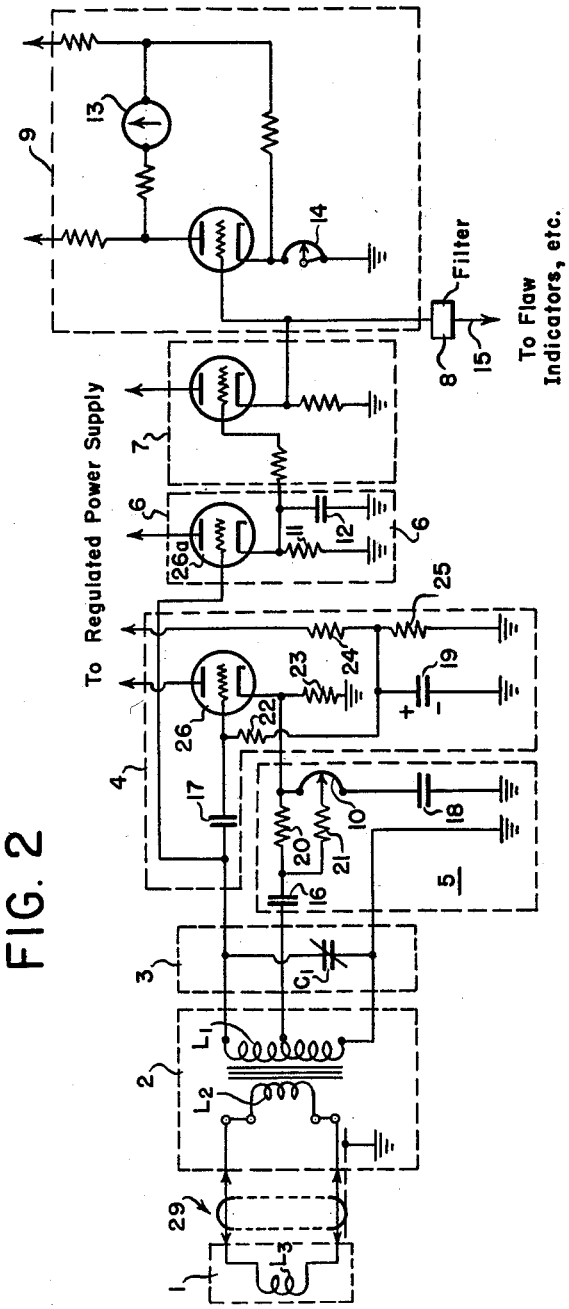
INVENTORS.
JOSEPH M. CALLAN
SVEN E. MANSSON
BY
Pennie, Edmonds, Morton, Barrows & Taylor
ATTORNEYS $$L = L_1 - \frac{\omega^2 M^2 L_4}{R_4^2 + \omega^2 L_4^2}$$

$$R = R_1 + \frac{\omega^2 M^2 R_4}{R_4^2 + \omega^2 L_4^2}$$

INVENTORS.
JOSEPH M. CALLAN
SVEN E. MANSSON
BY
*Pennie, Edmonds, Morton, Barrows and Taylor*
ATTORNEYS

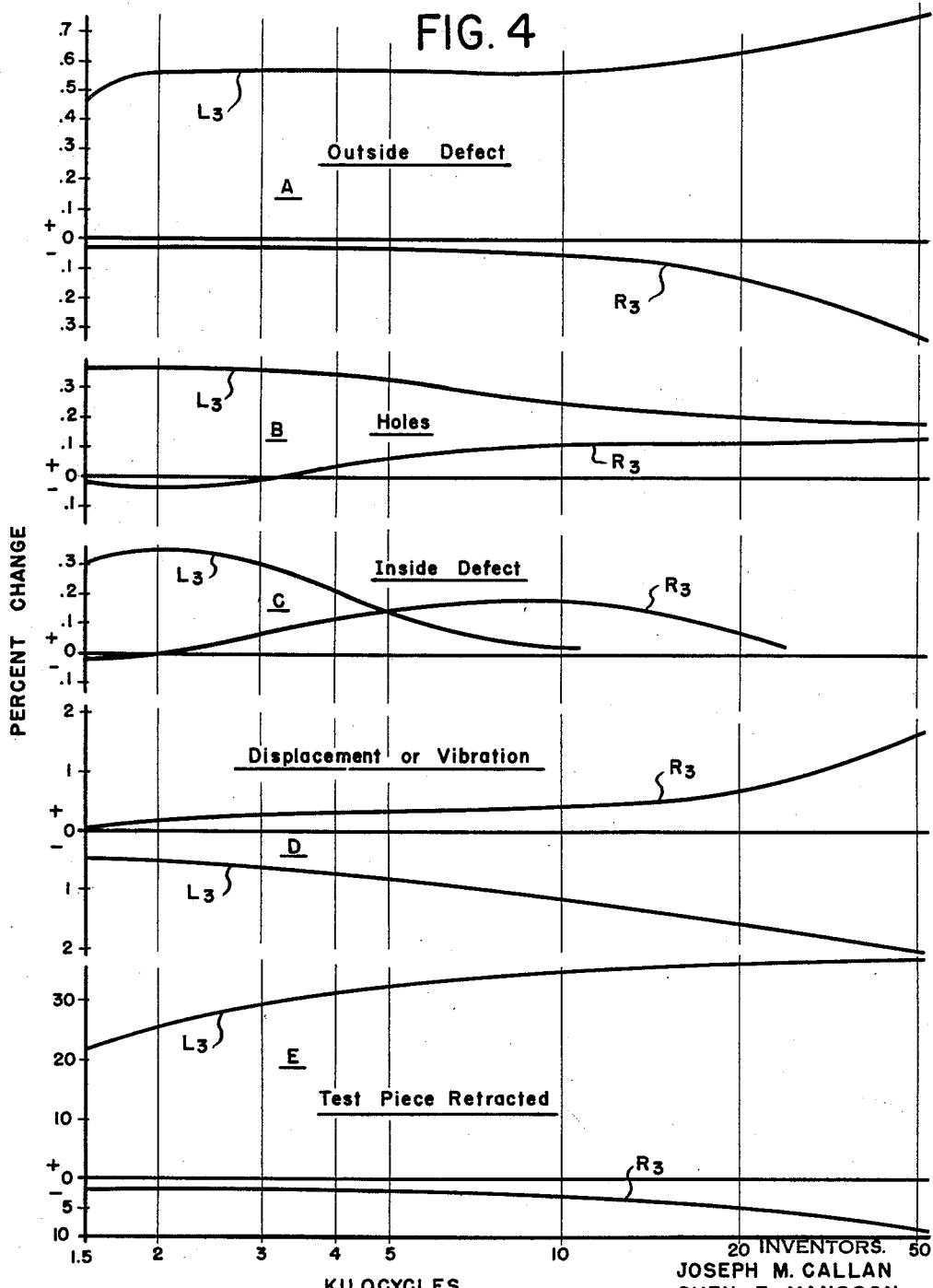

United States Patent Office 3,135,914
Patented June 2, 1964

3,135,914
MULTI-FREQUENCY TESTING METHOD AND APPARATUS FOR SELECTIVELY DETECTING FLAWS AT DIFFERENT DEPTHS
Joseph M. Callan, Pelham Manor, and Sven E. Mansson, Whitestone, N.Y., assignors to Magnetic Analysis Corporation, Long Island City, N.Y., a corporation of New York
Filed Sept. 4, 1959, Ser. No. 838,106
6 Claims. (Cl. 324—40)

This invention relates to non-destructive testing of non-magnetic and para-magnetic metals. The invention resides in apparatus for and a method of testing such metals by the use of eddy-currents.

The apparatus and method hereinafter described have general application to a wide variety of products including bar stock and wire, but are especially useful in the testing of tubing and the like because the apparatus is selectively sensitive to defects or flaws which are located on the inside of the tubing as well as on the outside thereof. Although inside flaws are common in tubing, they also occur in the interior of bar stock, and heretofore they have been difficult or impossible to detect because they provide such a weak indication in the detecting device which is necessarily located on the outside of the material. Such weak indications were usually masked by the stronger indications caused by normal outside variations and irregularities or by vibration of the material. If they were not entirely masked, they could not be distinguished from very small outside flaws or variations in the material.

The novel design and method of operation of the apparatus according to the present invention permits the detection and selective indication of inside flaws in the presence of outside variations as well as in the presence of vibration. Furthermore, by use of several frequencies simultaneously it is now possible to detect inside and outside flaws independently, and also simultaneously if they so occur.

The invention and its many valuable advantages will be understood from the following description considered in connection with the accompanying drawings, in which:

FIG. 1 is a block diagram of apparatus comprising the invention;

FIG. 2 is a schematic circuit diagram of the apparatus represented in FIG. 1;

Figure 3:
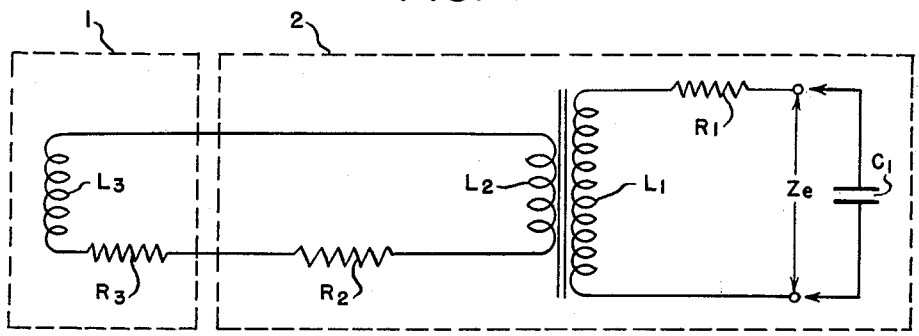
FIG. 3 and FIG. 3a are equivalent circuit diagrams representing the detector coil and components which couple the same to the oscillator in alternative arrangements.

FIG. 4 comprises five charts illustrating inductance-resistance relationships which constitute an important aspect of the invention.

The system of the invention is illustrated in FIG. 1 which shows the principal components of the apparatus in block diagram form. As here represented, a pickup or detector coil 1 is coupled to the oscillator 4 through a transformer 2. An adjustable frequency control 3 tunes the oscillator to a desired frequency. A balance control 5 is included in the oscillator for the purpose later described.

The output amplitude of the oscillator varies in accordance with the nature and magnitude of the detected flaws or defect. In the specification and claims the term "variation" is used in a general sense to include not only physical defects, but also variations in dimensions, and variations in chemical, physical and metallurgical properties. This output voltage is demodulated in the demodulator 6, subsequently amplified in amplifier 7 and, after passing through a filter 8, is caused to actuate various required indicators such as neon lamps, horns and markers.

The D.C. meter 9 which is also connected to the amplifier 7 is employed in adjusting the equipment as well as to provide other information.

A preliminary understanding of the invention and of some of its novel aspects will be had from the following general discussion of the apparatus represented in the circuit diagram, FIG. 2. In this diagram the circuit components are surrounded by dashed-line enclosures which are numbered the same as the corresponding blocks in FIG. 1. Numerical values for the more important of the circuit elements are given by way of example at the end of the specification.

*General Description*

Heretofore, apparatus for eddy-current testing has involved certain compromises because of the necessity of including elements having incompatible characteristics. Briefly, these include the following: To maintain oscillation at sufficient amplitude and of the required frequencies requires a high impedance tuning coil $L_1$. The detector coil $L_3$ should preferably be of low impedance because of the required small physical dimensions and the requirement that the effect on this coil by flaws in the material under test should produce maximum change in inductance and loss resistance. Furthermore, the detector coil must be employed several feet away from the remainder of the equipment; but long leads of high impedance tend to be sensitive to external electrical interference, and introduce circuit design complications when they are connected into a tuned oscillator circuit. One of these is that the oscillator tuning inductance should not exhibit a high resistive component of the impedance; yet it has been the experience in the art that to achieve adequate variation of amplitude with varying flaw conditions the detector coil must effectively be connected in the oscillator circuit.

In order to retain the advantages of high sensitivity to flaws and low detector coil impedance, and also a suitable ratio of inductive reactance to resistance in the tuning inductance of the oscillator, together with maximum coupling effect between the detector coil and the oscillator, new coupling means is employed by which the optimum conditions in all respects are provided. This will become clear as the description proceeds.

The pickup or detector element 1 may, for many applications, comprise a single coil $L_3$ of fine wire wound on a cylindrical form such as polystyrene, for example, having an open center. The impedance should be low and should be substantially the same regardless of the diameter of the material being tested and, hence, of the coil. Therefore, a small coil suited to pass a rod or wire of small diameter, say 1/16 inch, will have many turns; whereas a coil suited to pass tubing or bar stock of comparatively large diameter, say 3 inches, will have few turns. The coil should be physically narrow so as to be sensitive to short flaws. A coil to test tubing having a one inch outside diameter, for instance, may comprise 20 turns of No. 32 wire which would have a resistance of 1.1 ohms and an inductance of 32 microhenries. This coil preferably has a U-shaped powdered iron (ferrite) ring surrounding it to concentrate the field. The self-resonant frequency of the detector coil, including the required length of connecting cable 29, must be above the highest frequency for which it is to be used. Practical coil values will be of the order of 10 to 40 microhenries. The resistance should be low—of the order of 0.5 to 3 ohms, a resistance of 1.5 ohms being a useful example.

If the system as herein described is duplicated, and employed simultaneously at different frequencies, two detector coils may be included in a compact detector unit having a grounded copper shielding plate between the coils. This type of pickup unit is more sensitive to flaws and less sensitive to vibration. Such a unit may also be used alone, the two coils being connected in parallel to the transformer secondary. In passing through this unit the flaw will produce a symmetrical pulse having an abrupt dip in the center. If only one coil is used with the copper shield the pulse will have the characteristic of half of that first described.

A coupling transformer 2 such as here employed to couple the detector coil in the oscillator circuit has not heretofore been used in eddy-current testing equipment. It has several novel aspects and introduces advantages, some of which were outlined above. In brief, its purpose is to couple the low-impedance detector coil to the comparatively high-impedance circuit of the oscillator 4, and to do so without preventing the oscillator from responding freely to changes of inductance and resistance due to flaws in the material under test. A turns ratio of approximately 1:100 is suitable for this transformer. The coupling between the windings is substantially unity. The core should be of magnetic material having very low losses and high permeability, and advantageously is of "pot-core" form. Magnetic ferrites are suitable, especially homogeneous crystals of metallic oxides known by the trade name "Ferrox Cube."

It will be noted from the circuit diagram that the oscillator output energizes pickup coil 1 through transformer 2 and thus generates an electromagnetic field which induces eddy-currents in the test piece. As a result of the effect of the flaws in the test piece on these eddy-currents, resistance and inductance changes are reflected in the oscillator tank circuit, and these, in turn, vary the oscillator amplitude and frequency.

Across the high-impedance, primary winding $L_1$ of transformer 2 is adjustable capacity $C_1$ by which the oscillating frequency of the oscillator 4 is adjustable. Although this can comprise a continuously adjustable condenser, it has been found expedient to employ instead, a series of fixed capacitors selective in seven steps by a suitable multi-point switch. In this embodiment, three frequency ranges are provided by three plug-in selector units each having seven steps of different capacities connected to a coupling transformer appropriate to that range. These ranges are respectively: (A) 1.8–17 kc.; (B) 23–120 kc.; and (C) 145–700 kc. Due to certain features of the system the same detector coil can be used for all three ranges.

Figure 3A:
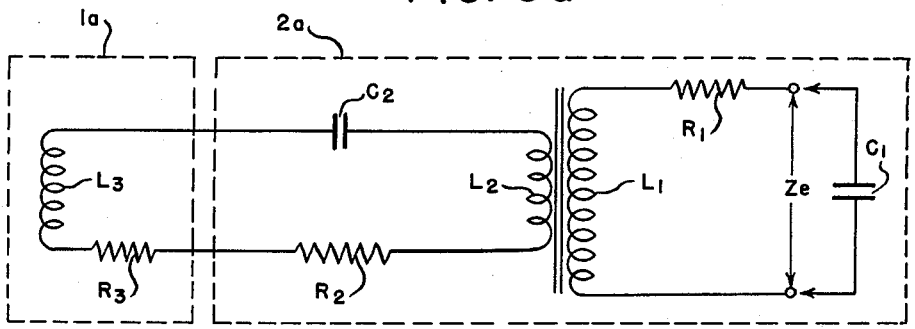

As a general rule, penetration increases with decreases of frequency, that is, the deeper or inside, defects produce a relatively stronger signal at the lower frequencies. Hence, the A-range is used for these. Also, the higher the conductivity of the material, the less the penetration. Hence, copper requires a lower frequency than hard brass, and both of these require lower frequencies than stainless steel, for example. The B-range and C-range units advantageously include capacitance in series with the detector coil and transformer primary, as illustrated in FIG. 3a, to accommodate the higher frequencies without materially altering the detector-coil characteristics. The C-range is useful primarily for detecting very small surface defects on material of very low conductivity or small diameter. The A-range, and B-range on the other hand, have very general applicability to many metal products, especially because of the possibility to compensate for the effects of outside variations described below under the heading "Compensation Effects."

The basic oscillator 4, as shown, is of the Hartley type, Class A, with the plate at A.C. ground potential. It is important for the purposes of the invention that this oscillator draw no grid current and that it have a substantially linear characteristic. Thus, the oscillation amplitude depends on the impedance of the oscillator tank circuit and, because of the fact that the detector coil is included in the oscillator circuit, this amplitude is a direct function of changes in impedance introduced into the tank circuit as a result of the effect of a flaw on the pickup coil. The oscillator circuit, as shown, can oscillate over a wide resonant frequency range, for example 2 to 700 kilocycles. A flaw may produce both a frequency change and an amplitude change in the oscillator circuit. It will be noted, however, that the system here described responds to changes in oscillator amplitude rather than frequency.

The oscillator balance control 5 is provided to permit an accurate adjustment of the oscillator amplitude as an initial adjustment step before the test is commenced. In the particular apparatus here illustrated as an example of the invention, potentiometer 10, preferably of Helipot type, is adjusted to a point at which oscillation will provide a 10-volt A.C. potential between the grid of tube 26 and ground.

The demodulator 6 is connected as an infinite impedance detector. As is clear from the diagram, it comprises a triode connected as a grounded plate rectifier. Since the cathode resistor 11 is of approximately 100K ohms, the negative peaks are beyond cutoff. Capacitor 12 together with resistor 11 and the impedance of tube 26a comprise a high-frequency elimination filter and a low-pass up to approximately 500 cycles.

Amplifier 7 is of the cathode follower type and passes signals in conventional manner to the D.C. meter circuit 9. The meter 13, of vacuum-tube voltmeter type, conveniently is provided with a zero-center scale calibrated to 100 in each direction. Potentiometer 14 is not accessible to the user of the equipment, but is adjusted at the factory so that when meter 13 reads zero, the oscillator output is 10 volts, as previously stated. This adjustment having been made, the oscillator balance potentiometer 10 is adjusted by the operator so that meter 13 reads zero, at which point the oscillator and the associated circuit components are in predetermined operating condition.

To adjust the oscillator circuit to the basic operating frequency suitable for the material to be tested, a frequency selector unit comprising a coupling transformer and adjustable tuning condenser appropriate for the material is first plugged into the main equipment cabinet. The cable 29 from the detector coil, in turn, is plugged into this unit which will cover one of the three frequency ranges previously mentioned. If the length of cable is changed, its wire size should be changed to maintain the resistance constant. After the apparatus has been put into operation and adjusted to zero, as above described, a perfect specimen of the material to be tested is inserted and retracted while the deflection of meter 13 is observed. The frequency-selector switch which adjusts capacity $C_1$, is moved one step at a time until minimum deflection occurs when the specimen is retracted from the coil, which signifies that the effect of the test piece is compensated at this frequency. In practice the tests can be made with the selector switch on this or the next higher frequency switch position. Because of the unity coupling in the transformer, the tuning of the oscillator circuit is affected by the detector coil. Thereafter flaws in material that is similar to the specimen will be indicated when the material is run through the detector coil field at rates as high as 600 feet per minute.

Although meter 13 is useful for purposes of adjustment as above explained, it provides an indication of the properties of the test specimen and also comprises a flaw indicator to the extent that it responds to gross flaws such, for example, as an open weld or the introduction of a test piece of a different size or of different metal from that for which the initial adjustment was made.

The filter 8 as here represented is connected to the output of cathode follower 7, and is proportioned, in the illustrated equipment, to pass frequencies up to 500 cycles per second. The output 15 from this filter is represented by an arrow in the drawing to indicate generally that the signal output is connected to actuate any desired indicators or signaling devices in a manner well known to the art of eddy-current flaw detection.

*Compensation Effects*

One of the novel aspects and valuable advantages of the present invention resides in the mentioned ability of the system to discriminate between inside and outside defects, variations, etc. In addition, it is capable of distinguishing to a considerable extent between defects and the result of vibration of the material under test. This is achieved by means of electrical compensation in the circuit of which the coupling transformer 2 and detector coil, are a part.

The five charts comprising FIG. 4 illustrate the phenomena on which the compensation is based.

The last chart, E, of FIG. 4 is based on measurements made on a test piece comprising a flawless sample of brass tubing having a wall thickness of 1/16 inch and an outside diameter of 2¼ inches. In making the measurements a detector coil of 12 turns of No. 32 enameled wire was connected to an A.C. impedance bridge, and the percentage changes of inductance and loss resistance were measured at various frequencies between 1.5 kc. and 50 kc. when the test piece was retracted from a position in the center of the test coil. It will be noted that the changes in loss resistance ($R_3$) are in a negative direction and that the changes in inductance ($L_3$) are in a positive direction with respect to zero. The significance of these changes is discussed below.

Inside and outside defects comprising shallow, narrow, circumferential grooves were made at separated locations on the inside and outside of the test piece; and at another location very small holes were drilled through the wall of the test piece. Measurements similar to those first made were then taken with respect to the outside defect, the holes and the inside defect, but in this case the test piece was moved from a non-defective portion to a position where the defect was centered in the detector coil. The measurements which represented the percent changes produced by interchanging the defective and non-defective portions at a succession of different frequencies, were plotted, and these are represented respectively in Charts A, B and C.

Chart D illustrates the results of measurements made with the test piece inserted in the coil at a point free from flaws but with lateral displacement or vibration of 1/16 inch amplitude. This chart shows the percent change in $L_3$ and $R_3$ when the test piece was displaced by that amount. Like Chart E, this shows that the changes of $L_3$ and $R_3$ are of opposite sign.

It is especially significant to observe that Chart A, of the outside defect, shows that $L_3$ and $R_3$ change in opposite directions throughout, whereas Chart C shows that the inside defect produces changes in $L_3$ and $R_3$ which are in the same direction, viz, are both plus, except below 2 kc.

The percent changes in $L_3$ and $R_3$ introduced by holes, as shown in Chart B, are both in the same direction, except below 3 kc.

The curves shown in the charts of FIG. 4 were based on measurements made on brass tubing of the dimensions above stated. However, curves of similar shape with corresponding changes and relationships in sign result from products of other dimensions and types, not only of brass, but of other non-magnetic and para-magnetic metals. The only substantial difference is that such curves may occur over different frequency ranges. These different ranges can readily be ascertained with respect to any desired product.

An important fact to be noted from the charts of FIG. 4 is that the percent changes in $L_3$ and $R_3$ with respect to inside defects are different and distinguishable from the percent changes of $L_3$ and $R_3$ resulting from outside defects or outside irregularities and displacement or vibration effects. According to the invention, advantage is taken of this fact by causing the changes in $L_3$ and $R_3$ which, in respect to a given type of defect or variation, are of opposite sign, to compensate each other, thus suppressing the effects of that type of defect or variation in favor of a comparatively non-compensating type in which $L_3$ and $R_3$ are of the same sign. Having ascertained by measurement, the frequency or the frequency range at which the desired compensation occurs in a given specimen of material to be tested, it is required only to operate the oscillator at that basic frequency when a run of such material is being tested.

Figure 3B:
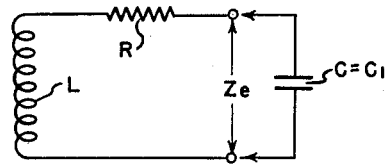
FIG. 3b represents the equivalent impedance at the transformer primary.

As the theory is understood, the following discussion correctly explains the basis on which the mentioned compensation is effected. Most of the symbols employed in this discussion are indicated in FIGS. 3, 3a and 3b. FIG. 3 is the equivalent circuit of the components 1, 2 and 3 of FIG. 2. FIG. 3a is a similar equivalent circuit of a modified embodiment as previously mentioned, which is recommended for use in frequency ranges above the A-range. As will be noted in the diagram, this circuit adds a capacity $C_2$ in series with inductances $L_2$ and $L_3$.

$Z_e$ = equivalent impedance = $R+j\omega L$
$C_1$ = tuning condenser for parallel tuning of primary
$R$ = resultant resistance
$R_1$ = loss resistance in primary
$L$ = resultant inductance
$L_1$ = inductance of transformer primary
$L_2$ = inductance of transformer secondary
$R_2$ = loss resistance of secondary winding (including losses in cable 2a from equipment to detector coil)
$L_3$ = inductance of detector coil (with material in coil)
$R_3$ = loss resistance of detector coil (with material in coil)
$M$ = mutual inductance = $\sqrt{L_1 L_2}$, for $K=1$ (perfect coupling)
$L_4 = L_2 + L_3$
$R_4 = R_2 + R_3$
$\omega = 2\pi f$ The equivalent impedance $Z_e$ comprises L and R wherein L tuned to parallel resonance by C, comprises the tank circuit of the oscillator.

As is more evident from FIG. 2, an oscillator of this type will produce large changes in amplitude as the result of very slight variations in the dynamic resistance of the tank circuit. The resonant frequency of the oscillator adjusts itself by virtue of the values of L, C and R to produce unity power factor in the tank circuit. It has been mentioned that $C_1$ is changed as an initial adjustment preliminary to running a test and that the values of L and R vary with $L_3$ and $R_3$ according to flaws or variations in the test piece.

The impedance of the tank circuit at unity power factor, i.e., the dynamic resistance of the parallel tuned circuit, is represented as $Z_0$, whence $$Z_0 = \frac{L}{CR} \quad (1)$$

$$Z_e = R + j\omega L = R_1 + \frac{\omega^2 M^2 R_4}{R_4^2 + \omega^2 L_4^2} + j\omega\left(L_1 - \frac{\omega^2 M^2 L_4}{R_4^2 + \omega^2 L_4^2}\right) \quad (2)$$

$$Z_0 = \frac{L}{CR} = \frac{1}{C} \times \frac{L_1 - \dfrac{\omega^2 M^2 L_4}{R_4^2 + \omega^2 L_4^2}}{R_1 + \dfrac{\omega^2 M^2 R_4}{R_4^2 + \omega^2 L_4^2}} \quad (3)$$

For unity power factor, $$\omega^2 = \frac{L - R^2 C}{L^2 C} \quad (4)$$

Equation 3 can be written $$Z_0 = \frac{1}{C} \times \frac{L_1 R_4^2 + L_1 \omega^2 L_4^2 - \omega^2 M^2 L_4}{R_1 R_4^2 + R_1 \omega^2 L_4^2 + \omega^2 M^2 R_4} \quad (5)$$

As previously mentioned, one of the main objects of the invention is to suppress the effect of outside defects and of vibration in order to obtain reliable indications of inside defects. Therefore, according to the invention it is desired that changes in $L_3$ and $R_3$ resulting from the effects of such undesired variations should compensate each other. In other words, referring to Equation 5, the numerator representing L should change by substantially the same percentage as the denominator representing R, so as to result in substantially no change in $Z_0$.

To express the relationship mathematically referring to Equation 5, the circuit values must be so chosen that the difference of the terms $L_1\omega^2L_4^2 - \omega^2M^2L_4$ is of the same order of value, numerically, as the term $L_1R_4^2$ also in the numerator. Since $M^2 = L_1L_2$ then $L_1\omega^2L_4^2 - \omega^2M^2L_4$ can be substituted by the term:

$$L_1\omega^2(L_4^2 - L_2L_4) \quad (6)$$

Since $L_2 = L_4 - L_3$, if $L_3$ is small with respect to $L_2$, the value of term 6 will be of the same order as $L_1R_4^2$. For small values of $L_3$ the numerical value of the term $L_4^2 - L_2L_4$ will approach zero, and the value of the whole term $L_1\omega^2(L_4^2 - L_2L_4)$ will be very small in spite of the very large value of $\omega$. At the same time the detector coil ($L_3$) must be of large enough value of inductance to produce a useful signal voltage.

From Equation 5 it is evident that the term $R_1R_4^2$ is very small as compared to the other terms in the denominator containing $\omega^2$, and can therefore be neglected. This equation also shows that a change in $R_4$ produced by a flaw or by displacement will produce approximately double the percentage change in the term $L_1R_4^2$ in the numerator as compared to the effect in the denominator. Also, as the terms in the numerator including $\omega^2$ are made very small, the effect of changes in $R_4$ has a considerable effect in the numerator. A change in the numerator represents a change in L, and therefore such change will affect $\omega^2$ in the opposite direction, as is obvious from Equation 4. Since $\omega^2$ is present in both terms in the denominator but not in the important term $L_1R_4^2$ in the numerator. It will cause a much greater change in the denominator and therefore tend to reduce the original change in $R_4$. As a result, a change in $R_4$ produces a much greater change in the numerator than in the denominator. In other words, a change in resistance in the detector coil here produces a much greater change in inductance in the tank circuit than in loss resistance in the tank circuit, which would not normally be expected.

Since our hypothesis is that there shall be no change in dynamic resistance in the parallel tuned tank circuit; a small change of opposite sign in $L_4$ (which has its predominant effect in the term of $L_1\omega^2L_4^2$) will be required to compensate for the change in $R_4$. Since the effect of changes in $L_4$ is great in the numerator, a very small percent change of $L_4$ is required to achieve the desired compensation. Thus it is possible to supress variations in the material which cause $L_3$ and $R_3$ changes having different signs, while detecting inside defects, for example, at the frequency which produces $L_3$ and $R_3$ changes of the same sign.

From Term 6 it is evident that for compensation of undesired effects the relationship between $R_3$ and $L_3$ will vary rapidly with frequency because of the $\omega^2$ term. As a practical matter it has been found that 5 kc. is approximately the upper useful limit of test frequencies to be employed in connection with the compensating system as presently described. This is evident from Term 6 which becomes excessively large compared to the term $L_1R_4^2$ at higher frequencies. From the foregoing it will be evident that the point of compensation can conveniently be shifted to a desired frequency by changing the resistance $R_2$, thereby influencing the total resistance $R_4$ and the relationship between $L_4$ and $R_4$ for compensation.

As a rule it is important to conduct the test at a frequency above that at which an inside defect produces changes in $L_3$ and $R_3$ of different sign. Also it is important to test for inside defects at as low a frequency as possible because of the previously stated fact that the response to inside defects increases with decrease of frequency. It will be noted that the resistance $R_4$ should be so chosen that compensation with respect to changes in $R_3$ and $L_3$ will be obtained at the frequency, or just above it, where the change of $R_3$ for an inside defect is changing in sign. In the case of Chart C, FIG. 4, this occurs at 2 kc.

The apparatus of the invention has been so designed as to facilitate the selection of the operating frequency at which the desired compensation is achieved. This is done, as previously explained, by inserting in the field of the detector coil and retracting therefrom, a specimen of the material to be tested, and selecting the frequency of the oscillator at which the meter 13 shows the least deflection. This frequency corresponds to the resonant frequency above which the changes in $L_3$ and $R_3$ representing inside defects are both of the same sign and therefore can be discriminated against in respect to outside variations. Although this frequency point will vary with different materials, it will be at a frequency which bears a fixed relationship to the corresponding values on the curves representing changes of $L_3$ and $R_3$ of the material itself, of which Chart E, FIG. 4, is an example.

The use of higher frequencies becomes necessary when it is desired to test materials of low conductivity. In order to achieve compensation at higher frequencies it is necessary to use a capacity ($C_2$) in series with the inductances $L_2$ and $L_3$, as represented in FIG. 3b. To create the previously described compensation in which $L_3$ and $R_3$ compensate each other, it is necessary, as before, that the term $L_1R_4^2$ is predominant in the numerator. The introduction of the capacity $C_2$ adds two more terms in the numerator and in the denominator, so that the equation for $Z_0$ is now:

$$Z_0 = \frac{1}{C_1} \times \frac{L_1R_4^2 + L_1\omega^2L_4^2 + \frac{L_1}{\omega^2C_2^2} - \frac{2L_1\omega L_4}{\omega C_2} - \omega^2M^2L_4}{R_1R_4^2 + R_1\omega^2L_4^2 + \frac{R_1}{\omega^2C_2^2} - \frac{2R_1\omega L_4}{\omega C_2} + \omega^2M^2R_4} \quad (7)$$

The two added terms in the denominator are of negligible importance and can be eliminated. If $C_2$ is chosen to be greater than $$\frac{1}{2L_4\omega^2}$$

the term $$-\frac{2L_1\omega L_4}{\omega C_2}$$

will be greater than the term $$+\frac{L_1}{\omega^2C_2^2}$$

and the difference can be subtracted from $L_1\omega^2(L_4^2 - L_2L_4)$ to keep the term $L_1R_4^2$ of predominant effect in the numerator. Once this has been achieved, the compensation will be the same as for the above-discussed A-range unit.

To assist in understanding the invention and to facilitate the construction and use of equipment for the purposes described, the following data with respect to practical embodiments of the invention are given by way of example. It is to be understood, however, that no limitations are intended thereby, the invention being limited only by the scope of the appended claims.

Typical values for a frequency selector unit to cover the A-range of 1.8 to 17 kc., are:

| | |
|---|---|
| $L_1 = 10$ h. | $R_1 = 2K$ ohms |
| $L_2 = 1$ mh. | $R_2 = 0.5$ ohms |
| $L_3 = 20$ μh. | $R_3 = 1.5$ ohms |

$$C_1 = 50\text{--}2000 \mu\mu f.$$

In general:

$L_1$ is chosen to provide the desired frequency range, and may be from 8 to 12 h.

$R_1$ should be as low as practicable and preferably not over 10K ohms.

$L_2$ is chosen such that the term $L_1\omega^2(L_4^2 - L_2L_4)$ is not greater than 10 times the term $L_1R_4$ in the frequency range 1.8 to 5 kc. (see $L_3$ below).

$L_3$ should be small to satify the condition mentioned above for $L_2$, keeping in mind that the self-resonance of $L_3$ plus its connecting cable should be higher than the highest frequency with which it is to be used.

$R_2$ may be of the order of 0.1 to 1.5 ohms.

Typical values for a frequency selector unit to cover the B-range of 23 to 120 kc., are as follows:

| | |
|---|---|
| $L_1$=30 mh. | $R_2$=0.5 ohm |
| $L_2$=20 μh. | $R_3$=1.5 ohms |
| $L_3$=20 μh. | $C_1$=50–2000 μμf. |
| $R_1$=5 ohms | $C_2$=1 μf. |

In general:

$L_1$ should be chosen to provide the desired frequency range, and may be from 25 to 35 mh.

$R_1$ should be as low as practicable, and preferably not over 10 ohms.

$L_2$ can have approximately the same value as $L_3$.

$L_3$ is assumed to be the same for all ranges.

$R_2$ will here comprise chiefly the resistance of the cable connecting the detector coil and may be of the order of 0.1 to 0.5 ohms.

$C_2$ should be greater than $$\frac{1}{2L_4\omega^2}$$

but not greater than approximately 4 times such value. In addition to the foregoing, the following typical values of circuit elements associated with the oscillator will be of interest.

| Condensers: | (Microfarads) |
|---|---|
| 12 | .05 |
| 16 | 0.5 |
| 17 | .01 |
| 18 | .004 |
| 19 | 4.0 |

| Resistors: | (Ohms) |
|---|---|
| 10 | 50K |
| 11 | 100K |
| 14, 20, 23 | 10K |
| 21 | 3.9K |
| 22 | 1 Meg. |
| 24 | 240K |
| 25 | 51K |
| Tube 26, 26a | Type 12AY7 |

We claim:

1. In an eddy-current testing system which includes a vacuum tube oscillator of the type drawing substantially no grid current, a tank circuit including capacitive and inductive impedances at least one of which is adjustable for tuning the oscillator over a wide frequency range, a cylindrical detector coil adapted to receive through its center a metal piece to be tested, a transformer coupling said coil to oscillator tank circuit such that said coil and transformer are included in said oscillator, and a meter for measuring the oscillator amplitude, the method of ascertaining the oscillator frequency in terms of impedance adjustment at which the inductive and resistive effects of the metal of said test piece on the oscillator are compensated such as to enhance the indication of the effects of defects in the test piece by changes in oscillator amplitude, which includes the steps of adjusting said adjustable impedance to cause said oscillator to generate oscillations of a first fixed frequency and predetermined amplitude, inserting in said detector coil a flawless standard specimen of metal to be tested, measuring the oscillator amplitude, retracting the specimen from the coil and measuring the oscillator amplitude resulting therefrom, readjusting said impedance by a small amount to cause the oscillator to generate oscillations at a second resonant frequency and again inserting and retracting the specimen and measuring the oscillator amplitudes respectively resulting therefrom, and repeating the readjustment of said impedance to cause the oscillator to generate oscillations at a series of different resonant frequencies and inserting and retracting the specimen at each different frequency, determining from said measurements the impedance adjustment at which the minimum change in oscillation amplitude results from the retraction of said specimen from said coil after insertion therein, and setting said impedance to an adjustment which causes the oscillator to oscillate at a slightly higher resonant frequency than that at which said minimum amplitude change was measured, for subsequent testing of metal pieces.

2. Eddy-current testing apparatus for detecting variations in metal pieces, said apparatus comprising a detector coil, an oscillator including a tunable tank circuit having inductance and capacitance, means coupled to said oscillator for indicating the oscillator amplitude, a transformer having a primary connected in said tank circuit and a secondary connected by leads to said coil, said primary and secondary being coupled together by substantially unity coupling, said detector coil, said tank circuit, said transformer and the frequency of said oscillator being proportioned and related in accordance with the equation $$Z_0 = \frac{1}{C} \times \frac{L_1 R_4^2 + L_1\omega^2 L_4^2 - \omega^2 M^2 L_4}{R_1 R_4^2 + R^1\omega^2 L_4^2 + \omega^2 M^2 R_4}$$

in which $Z_0$=impedance of tank circuit at unity power factor; $C$=tuning capacity of tank circuit; $L_1$=inductance of transformer primary; $L_4$=sum of inductances of transformer secondary and of detector coil (with the metal piece in the coil); $R_1$=loss resistance in transformer primary; $R_4$=sum of loss resistance of transformer secondary (including losses in said connecting leads) and loss resistance of detector coil (with the metal piece in the coil); $M$=mutual inductance between transformer primary and secondary (at substantially unity coupling); and $\omega=2\pi f$; such that changes in inductance and loss resistance due to said outside variations and due to vibration of the test piece with respect to said coil, compensate each other at least in part, and are thereby suppressed while changes in inductance and loss resistance due to internal variations in said piece are detected.

3. Eddy-current testing apparatus for detecting internal variations in a metal piece discriminately with respect to variations near the outside thereof, said apparatus comprising a cylindrical detector coil adapted to accommodate a metal piece to be tested in the center thereof, an oscillator including a tunable tank circuit having inductance and capacity, means coupled to said oscillator for indicating the oscillator voltage amplitude, a transformer having a primary connected in said tank circuit and a secondary connected by leads to said coil, one of said leads including a series condenser, said primary and secondary being coupled together by substantially unity coupling, said detector coil, said tank circuit, said transformer, said series condenser and the frequency of said oscillator being proportioned in accordance with the equation $$Z_0 = \frac{1}{C_1} \times \frac{L_1 R_4^2 + L_1\omega^2 L_4^2 + \frac{L_1}{\omega^2 C_2^2} - \frac{2L_1\omega L_4}{\omega C_2} - \omega^2 M^2 L_4}{R_1 R_4^2 + R_1\omega^2 L_4^2 + \frac{R_1}{\omega^2 C_2^2} - \frac{2R_1\omega L_4}{\omega C_2} + \omega^2 M^2 R_4}$$

in which $Z_0$=impedance of tank circuit at unity power factor; $L_1$=inductance of transformer primary; $L_4$=sum of inductances of transformer secondary and of detector coil (with the test piece in the coil); $R_1$=loss resistance in transformer primary; $R_4$=sum of loss resistance of transformer secondary (including losses in said connecting leads) and loss resistance of detector coil (with the test piece in the coil); $C_1$=tuning capacity in parallel to transformer primary; $C_2$=capacity in series between detector coil and transformer secondary; $M$=mutual inductance between transformer primary and secondary (at substantially unity coupling); and $\omega=2\pi f$; such that changes in inductance and loss resistance due to said outside variations compensate each other at least in part and are thereby suppressed, while changes in inductance and loss resistance due to internal variations in said piece are detected.

4. In a multi-frequency eddy-current testing system, an oscillator circuit tunable over a wide range of resonant frequencies, including a vacuum tube oscillator of the type drawing substantially no grid current, a tank circuit having adjustable capacitance for tuning the oscillator circuit over a wide range of resonant frequencies, a detector coil adapted to be positioned in inductive relation to a test piece, a transformer having a primary and a secondary coupled together with substantially unity coupling, said primary being connected in said tank circuit, an A.C. feedback connection from an electrode of the vacuum tube in said oscillator to a point of intermediate impedance between the terminals of said primary, and connections from the terminals of said secondary to the terminals of said detector coil, said detector coil and the reactance of said connections resonating at a frequency higher than tht highest frequency to which said oscillator circuit is tunable in normal use in said eddy-current testing, and meter means coupled to said oscillator circuit for measuring the amplitude of the output voltage thereof over said range of resonant frequencies.

5. In eddy-current testing for variations in metal pieces in which a metal piece is passed through the field of a detector coil which is coupled to an oscillator, said oscillator including a tank circuit to which said coil is so coupled that said coil is included in said oscillator, and having means for measuring the oscillator output voltage; the method of discriminating between the effects on said coil of variations on the outside of the metal piece with respect to internal variations and thereby pre-dominantly indicating the presence of internal variations in said metal piece, which comprises: determining by a first series of measurements at a plurality of different frequencies over a test frequency range within approximately 1.5 kc. to 50 kc. on an A.C. impedance bridge the percent changes in loss resistance and in inductance, respectively, produced by interchanging in the field of a test coil connected in an arm of said bridge a section of metal test piece which has an internal variation only, with a section of a similar metal test piece which has substantially no variations, and plotting curves of said measurements which establish that said changes are of the same sign; determining by a second series of measurements at a plurality of different frequencies over the same test frequency range within approximately 1.5 kc. to 50 kc. on said A.C. impedance bridge the percent changes in loss resistance and in inductance, respectively, produced by interchanging in the field of said test coil connected in the arm of said bridge a section of a similar metal test piece which has an outside variation only, with a section of a similar metal test piece which has substantially no variations, and plotting curves of said second series of measurements which establish that said last-mentioned changes are of opposite sign; and thereafter testing for unknown internal variations in similar metal pieces by causing said oscillator to oscillate at a frequency at least as high as one common to said curves while passing said metal pieces through the field of said detector coil and simultaneously measuring the oscillator output voltage.

6. In eddy-current testing for variations in metal pieces in which a metal piece is passed through the field of a detector coil which is coupled to an oscillator, said oscillator including a tank circuit to which said coil is so coupled that said coil is included in said oscillator, and having means for measuring the oscillator output voltage; the method of discriminating between the effects on said detector coil of internal variations in said metal piece and of vibration of said piece with respect to said coil and thereby predominantly indicating the presence of internal variations in said metal piece, which comprises: determining by a first series of measurements at a plurality of different frequencies over a test frequency range within approximately 1.5 kc. to 50 kc. on an A.C. impedance bridge the percent changes in loss resistance and in inductance, respectively, produced by alternately vibrating and stopping the vibration of a section of metal test piece which has substantially no variations in the field of a test coil connected in an arm of said bridge, and plotting curves of said measurements which establish that said changes are of opposite sign; determining by a second series of measurements at a plurality of different frequencies over the same test frequency range within approximately 1.5 kc. to 50 kc. on said A.C. impedance bridge the percent changes in loss resistance and in inductance, respectively, produced by interchanging in the field of said test coil connected in the arm of said bridge a section of similar metal test piece which has an internal variation only, with a section of a similar metal test piece which has substantially no variations, and plotting curves of said second series of measurements which establish that said last-mentioned changes are of the same sign; and thereafter testing for unknown internal variations in similar metal pieces subject to said vibrations by causing said oscillator to oscillate at a frequency at least as high as one common to said first and second test frequency ranges while passing said metal pieces through the field of said detector coil and simultaneously measuring the oscillator output voltage.

References Cited in the file of this patent

UNITED STATES PATENTS

| | | |
|---|---|---|
| 2,564,777 | Cavanagh | Aug. 21, 1951 |
| 2,894,203 | Cory | July 7, 1959 |
| 2,920,269 | Hanysz et al. | Jan. 5, 1960 |
| 2,939,073 | Eul | May 31, 1960 |